(12) United States Patent
Weigen

(10) Patent No.: US 10,624,404 B2
(45) Date of Patent: Apr. 21, 2020

(54) POWERED HELMET CONTAINING A PLURALITY OF CHANNELS FOR CUSTOMIZABLE SECURING OF ELECTROLUMINESCENT WIRES

(71) Applicant: Dana Ruth Weigen, Atlanta, GA (US)

(72) Inventor: Dana Ruth Weigen, Atlanta, GA (US)

(*) Notice: Subject to any disclaimer, the term of this patent is extended or adjusted under 35 U.S.C. 154(b) by 0 days.

(21) Appl. No.: 15/899,109

(22) Filed: Feb. 19, 2018

(65) Prior Publication Data

US 2018/0235302 A1    Aug. 23, 2018

Related U.S. Application Data

(60) Provisional application No. 62/461,506, filed on Feb. 21, 2017.

(51) Int. Cl.
| | | |
|---|---|---|
| *A42B 3/04* | (2006.01) | |
| *F21V 23/06* | (2006.01) | |
| *F21V 21/088* | (2006.01) | |
| *B60Q 1/26* | (2006.01) | |

(52) U.S. Cl.
CPC .......... *A42B 3/044* (2013.01); *A42B 3/0453* (2013.01); *B60Q 1/2676* (2013.01); *F21V 21/0885* (2013.01); *F21V 23/06* (2013.01)

(58) Field of Classification Search
None
See application file for complete search history.

(56) References Cited

U.S. PATENT DOCUMENTS

| | | | |
|---|---|---|---|
| 5,426,792 A | 6/1995 | Murasko | |
| 5,479,325 A | 12/1995 | Chien | |
| 5,810,467 A | 9/1998 | Hurwitz | |
| 6,497,493 B1 * | 12/2002 | Theisen | A42B 3/044 |
| | | | 2/422 |
| 6,779,913 B2 | 8/2004 | Niezrecki et al. | |
| 2007/0064413 A1 | 3/2007 | Slater | |
| 2009/0303698 A1 * | 12/2009 | Huss | A42B 3/0433 |
| | | | 362/105 |
| 2010/0177505 A1 * | 7/2010 | Ho | A42B 3/044 |
| | | | 362/106 |
| 2013/0174323 A1 | 7/2013 | Mcfall | |
| 2014/0020159 A1 | 1/2014 | Teetzel et al. | |
| 2014/0247129 A1 * | 9/2014 | de la Fuente | A42B 3/046 |
| | | | 340/573.1 |

(Continued)

*Primary Examiner* — Elmito Breval
(74) *Attorney, Agent, or Firm* — Alston & Bird LLP

(57) ABSTRACT

A helmet is provided that comprises a contoured external surface; a controller positioned on the contoured external surface; one or more channels embedded within the contoured external surface and defining two or more elongate pathways travelling over at least a portion of the contoured external surface; at least one electroluminescent (EL) wire located within and extending along at least a portion of the one or more channels, the EL wire being further selectively electrically connected to the controller; and a plurality of pairs of retaining elements periodically positioned adjacent the one or more channels. Each retaining element within each pair is located on an opposing side of the one or more channels, and an opening defined between a portion of each of the plurality of pairs of retaining elements has a dimension less than a diameter of the EL wire. Associated method and computer program product are also provided.

20 Claims, 10 Drawing Sheets

(56) References Cited

U.S. PATENT DOCUMENTS

2016/0360817 A1* 12/2016 Lombard ............ F21V 33/0008
2017/0196289 A1*  7/2017 Zheng ................. F21V 33/0064
2018/0055129 A1*  3/2018 Harris .................... A42B 3/044
2018/0140034 A1*  5/2018 Scott ...................... A42B 3/044
2019/0053562 A1*  2/2019 Bailey .................... A42B 3/044

* cited by examiner

POWERED HELMET CONTAINING A PLURALITY OF CHANNELS FOR CUSTOMIZABLE SECURING OF ELECTROLUMINESCENT WIRES

CROSS-REFERENCE TO RELATED APPLICATIONS

This application claims priority to and the benefit of U.S. Provisional Patent Application Ser. No. 62/461,506, filed Feb. 21, 2017, the contents of which as are hereby incorporated by reference in their entirety.

BACKGROUND

The present invention relates generally to improvements to user-worn (i.e, bicycle) helmets. Of particular concern with conventional helmets is visibility and safety of wearers thereof. A lack of customization, whether for visibility, user-identification, or other purposes also exists. Thus, a need exists for improvements to user-worn helmets so as to heighten visibility of users, improve customization of visibility-enhancing features, and the like.

BRIEF SUMMARY

An object of the invention is to provide improvements to user-worn (i.e, bicycle) helmets. This object is achieved by the features according the claims recited herein.

According to at least one described embodiment, a helmet is provided that comprises: a contoured external surface; a controller positioned on the contoured external surface; one or more channels embedded within the contoured external surface and defining two or more elongate pathways travelling over at least a portion of the contoured external surface; at least one electroluminescent (EL) wire located within and extending along at least a portion of the one or more channels, the EL wire being further selectively electrically connected to the controller; and a plurality of pairs of retaining elements periodically positioned adjacent the one or more channels, wherein: each retaining element within each pair being located on an opposing side of the one or more channels, and an opening defined between a portion of each of the plurality of pairs of retaining elements has a dimension less than a diameter of the EL wire.

According to at least another described embodiment, a method of using a helmet is provided that comprises the steps of: obtaining a helmet comprising: a contoured external surface; a controller positioned on the contoured external surface; one or more channels embedded within the contoured external surface and defining two or more elongate pathways travelling over at least a portion of the contoured external surface; and a plurality of pairs of retaining elements periodically positioned adjacent the one or more channels. The method further comprises the steps of: positioning at least one electroluminescent (EL) wire within and extending along at least a portion of the one or more channels, the positioning involving pressing the EL wire between the plurality of pairs of retaining elements and into the one or more channels; selectively electrically connecting the EL wire to the controller; and executing a processor of the controller to selectively alter at least one characteristic of the EL wire based upon an input received from the wearer of the helmet, wherein an opening defined between a portion of each of the plurality of pairs of retaining elements has a dimension less than a diameter of the EL wire.

Also provided according to various embodiments is a computer program product comprising at least one non-transitory computer-readable storage medium having computer-readable program code portions embodied therein, the computer-readable program code portions comprising at least one executable portion configured for selectively altering at least one characteristic of at least one electroluminescent (EL) wire attached to a helmet based upon an input received from the wearer of the helmet, wherein the helmet comprises: a contoured external surface; a controller positioned on the contoured external surface; one or more channels embedded within the contoured external surface and defining two or more elongate pathways travelling over at least a portion of the contoured external surface; and a plurality of pairs of retaining elements periodically positioned adjacent the one or more channels, wherein the at least one EL wire is positioned within and extends along at least a portion of the one or more channels, and is retained within the one or more channels, at least in part, via the plurality of pairs of retaining elements.

BRIEF DESCRIPTION OF SEVERAL VIEWS OF THE DRAWINGS

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
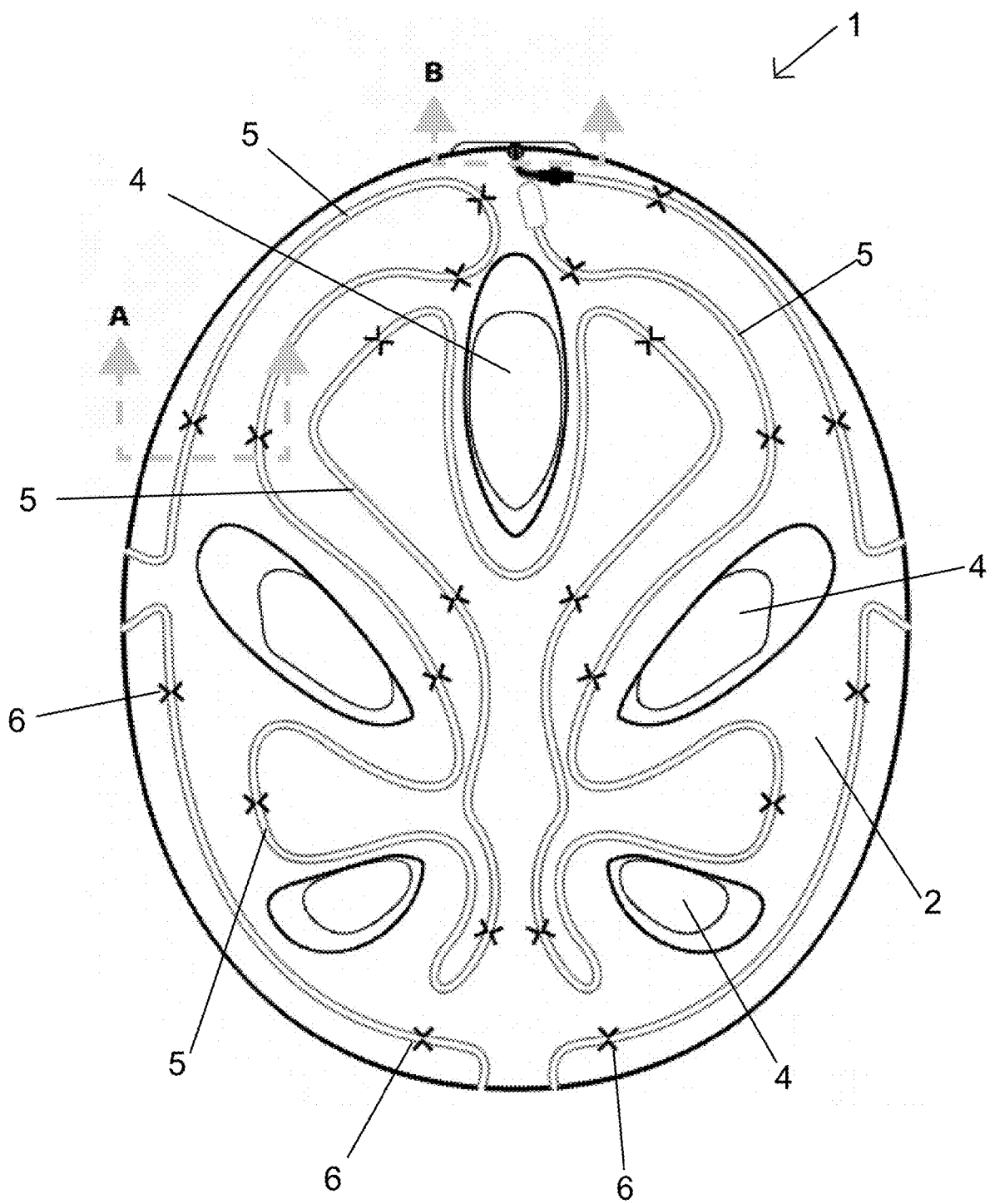
FIG. 1 depicts a top view of the helmet according to various embodiments described herein.

Generally speaking and with reference to FIG. 1, there is provided a helmet 1 containing a plurality of channels 5 configured for customizable receipt therein of embedded electroluminescent (EL) wire 20. Non-limiting advantages realized via the various embodiments described herein are enhanced safety and visibility of wearers of the helmet, customizable lighting patterns, and/or customizable light sequences. In this manner, a wearer of the helmet 1 may create desired patterns of their own by routing the EL wire 20 in any of a variety of fashions through a plurality of channels 5 that intersect one another and that are provided on an exterior surface 2 of the helmet. This may be done to provide a desired pattern, symbol, word(s), or the like, visible to others nearby the wearer/user.

Figure 10:
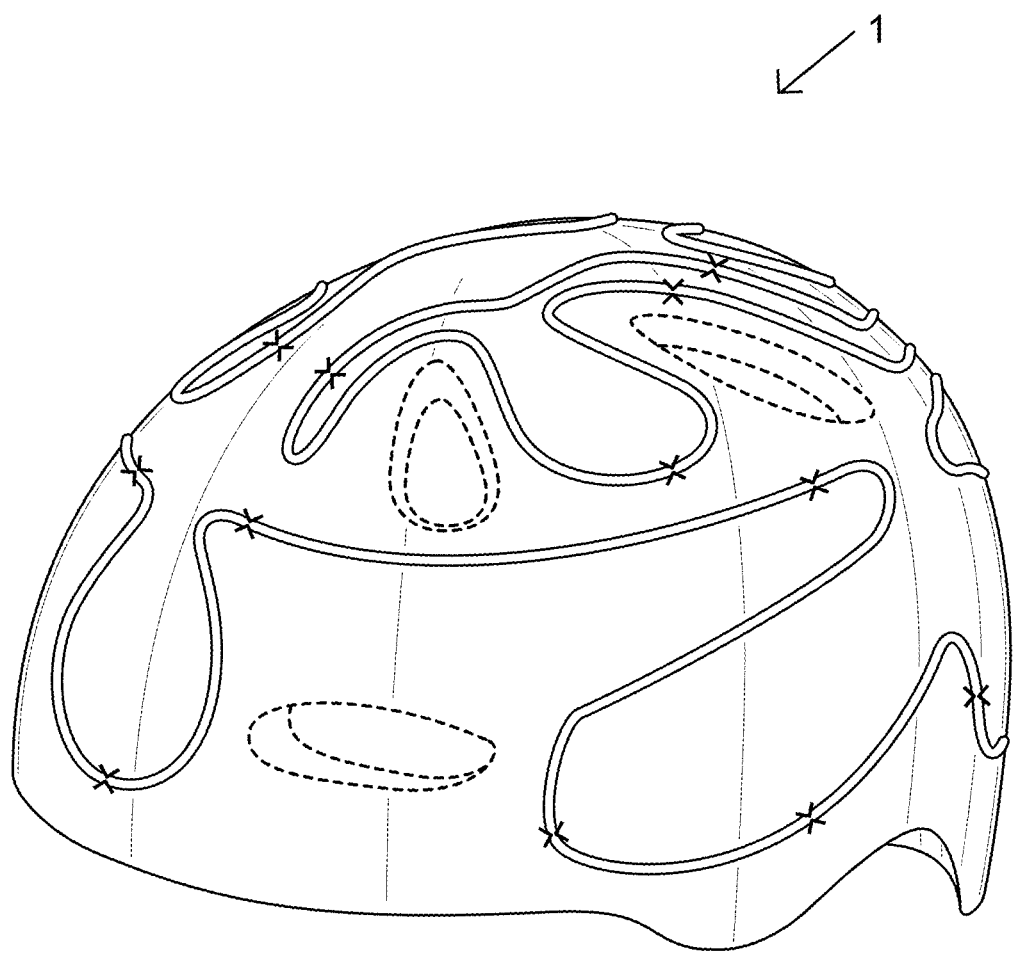
FIG. 10 depicts a top perspective view of the helmet of FIG. 1.

According to various embodiments with reference still to FIG. 1 (and also perspective view FIG. 10), the helmet 1 may be analogous to a conventional helmet (i.e., a bicycle) helmet in that it may include an external surface 2, an internal surface 3 (see FIG. 3), and one or more—and oftentimes a plurality of—apertures 4. It should be understood that the external/internal surfaces 2, 3 may be generally contoured to fit a wearer's head and/or to optimize aerodynamic principles, as may be desirable and/or as commonly known and understood in the helmet industry. The helmet 1—and in particular the external and/or internal surfaces 2, 3 may also be constructed of a polymer or plastic material, as is also commonly known and understood and utilized in the helmet industry. Via a blow-molding process or the like, a plurality of channels 5 (as detailed further below) may be formed in an embedded within the exterior surface 2 of the helmet 1. Of course, in certain embodiments, for various purposes (i.e., strength, structural integrity, and the like) the surfaces of the helmet may be constructed of materials other than polymer or plastic materials.

Figure 2:
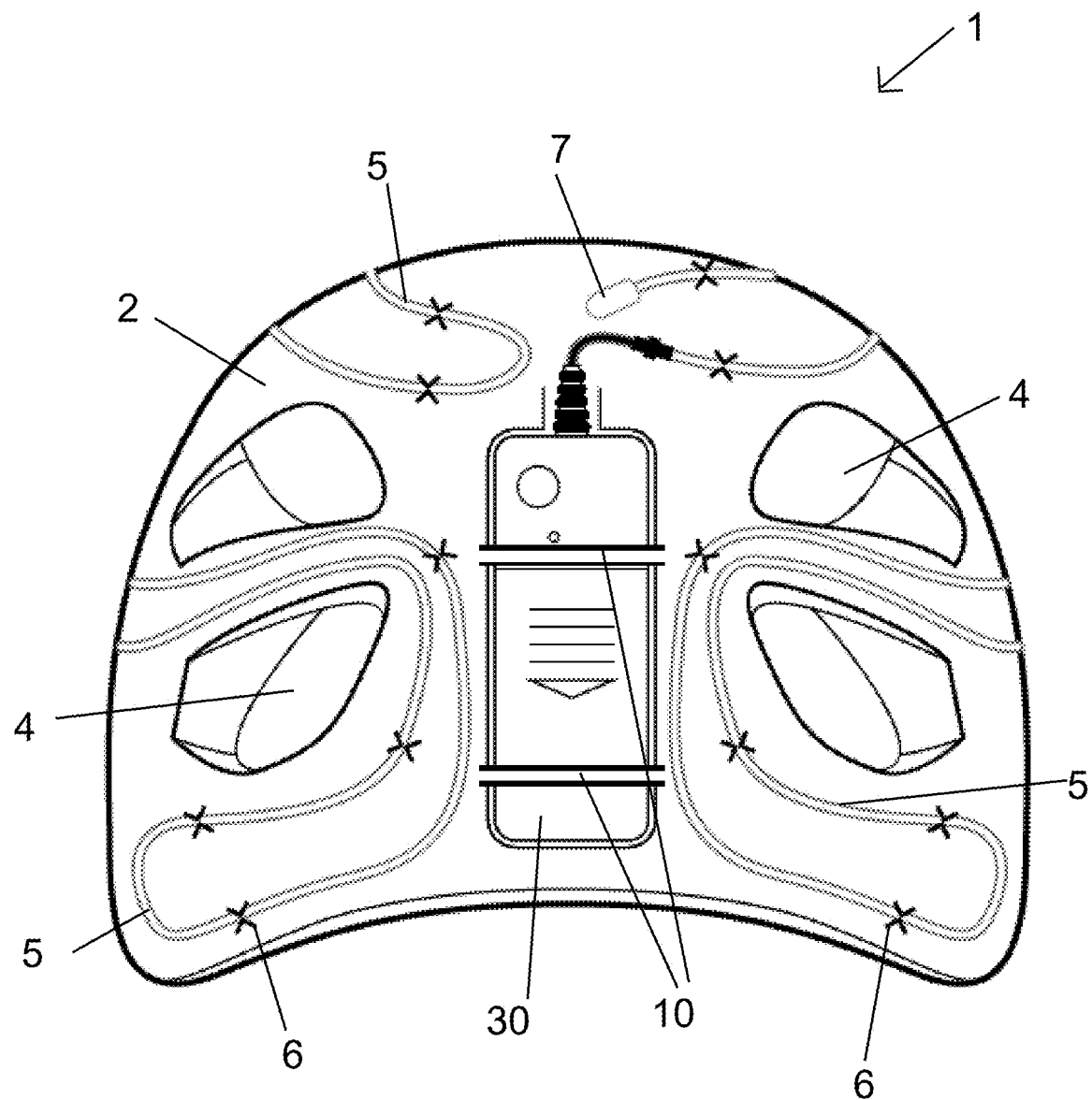
FIG. 2 depicts a rear view of the helmet of FIG. 1.
Figure 3:
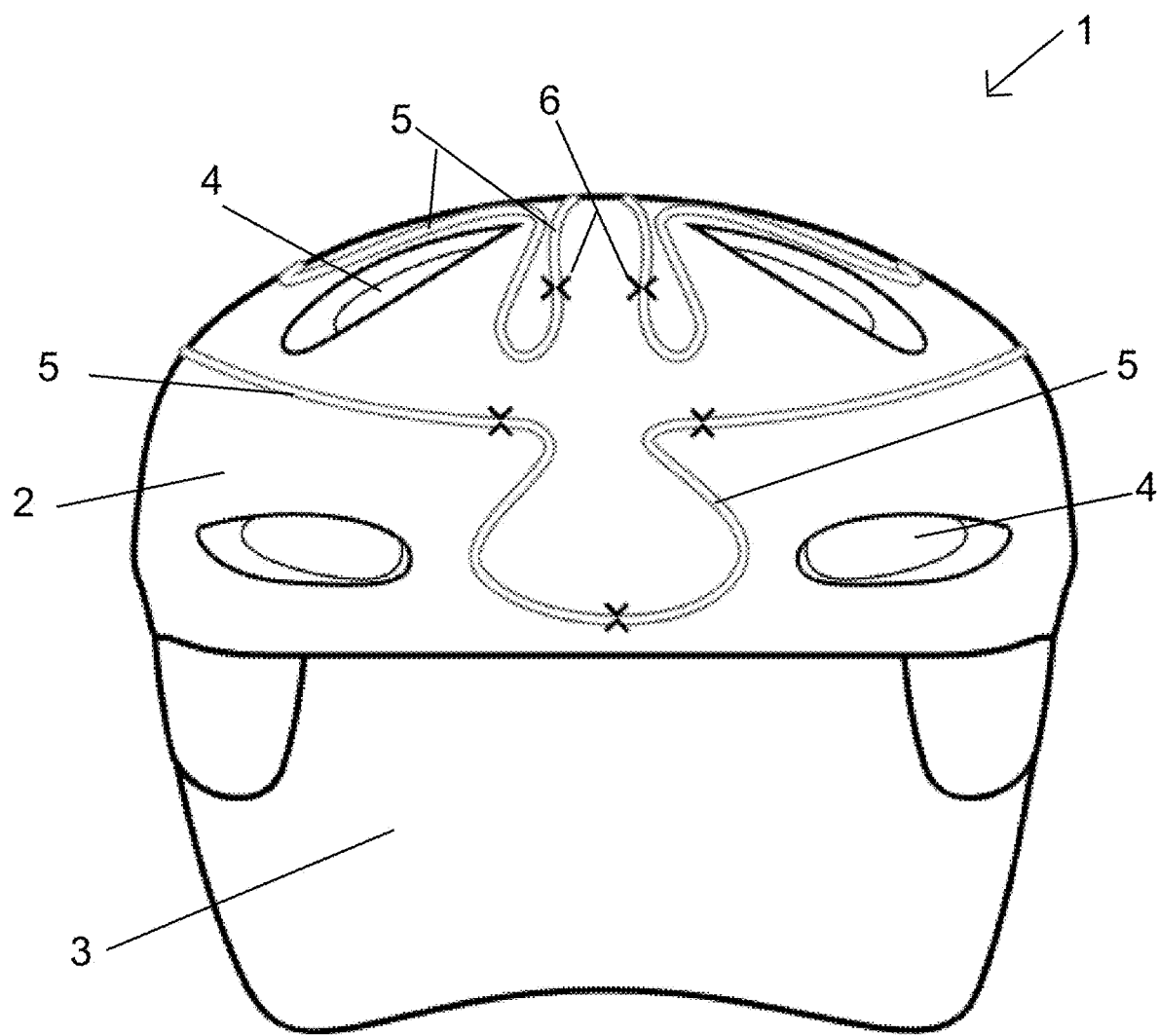
FIG. 3 depicts a front view of the helmet of FIG. 1.

Remaining with FIGS. 1-3, it should also be understood that the one or more—and oftentimes a plurality of—apertures 4 may be distributed across substantially the entirety of the external surface 2 of the helmet. The provision of the apertures 4 may be patterned (i.e., symmetric; see FIG. 1) or otherwise. The apertures 4 may also substantially extend through the helmet (i.e., passing from the external 2 to the internal surface 3 of the helmet). In certain embodiments the apertures 4 may define passages of constant diameter; in other embodiments, the passages defined by the apertures 4 may be tapered in nature.

Figure 4:
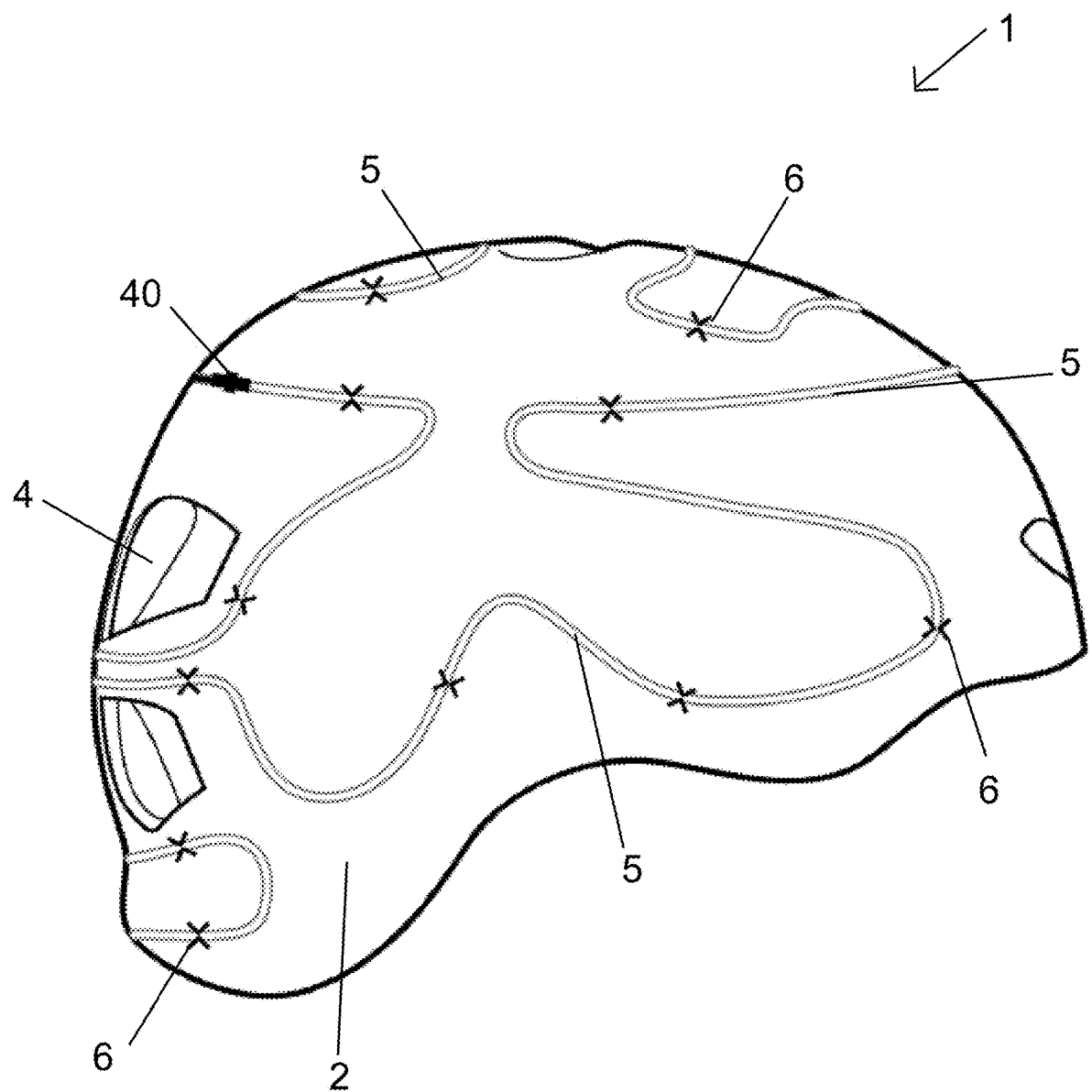
FIG. 4 depicts a right side view of the helmet of FIG. 1.
Figure 5:
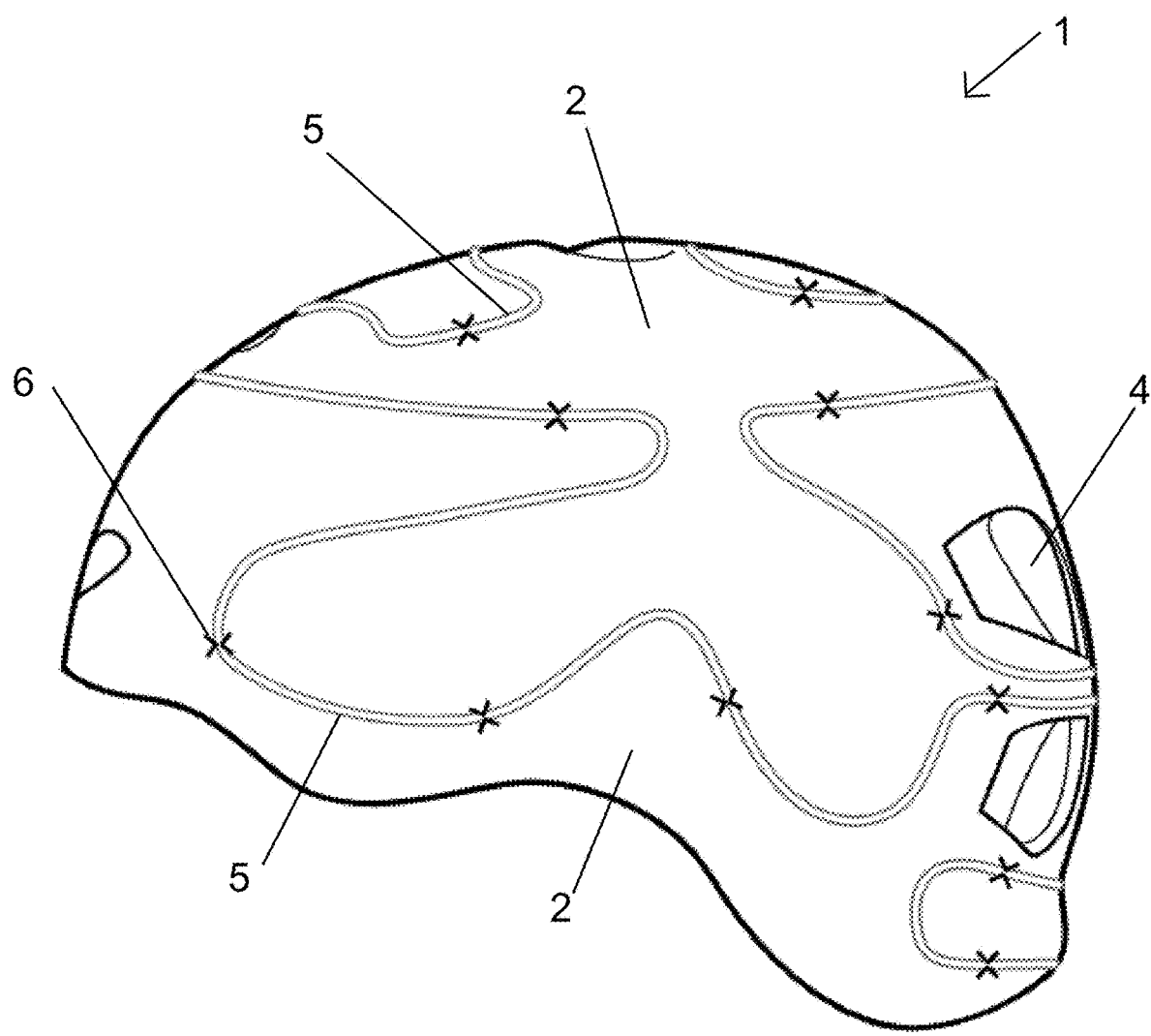
FIG. 5 depicts a left side view of the helmet of FIG. 1.
Figure 6:
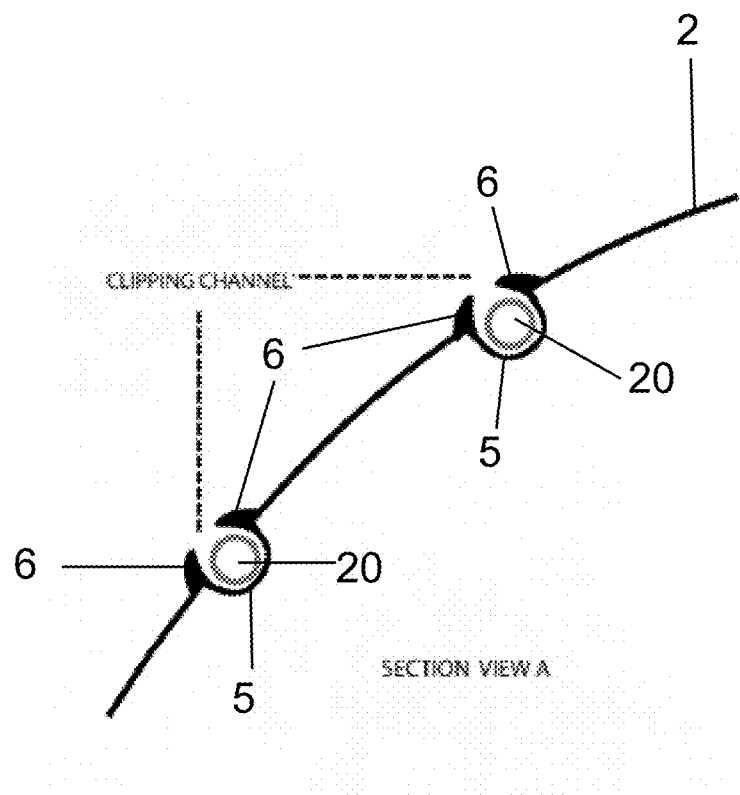
FIG. 6 depicts cross-section view A of FIG. 1, illustrating detail of channels contained within the helmet of FIG. 1.

According to various embodiments and with continued reference to FIGS. 1-3 and new reference to FIGS. 4-5, the helmet 1 provided herein also typically contains one or more or a plurality of embedded channels 5, each configured for receipt of the EL wire 20 (see also FIG. 6). The channels 5 may be multi-directional and intersecting with one another, such that the EL wire 20 may be configured to travel there-through in a wearer-customizable manner. Stated otherwise, there may preferably be multiple pathways or routes (i.e., as defined by the channels 5) through which a wearer may selectively place the EL wire 20, as desirable.

With reference to FIGS. 1-5 in combination, it should be understood that the channels may cover largely an entirety of the exterior surface 2 in certain embodiments; in other embodiments, however, the channels may appear only in one or more specific areas (e.g., the front or rear or only opposing sides) of the helmet 1. As illustrated, by way of example in FIGS. 4 and 5, the pathways defined by the embedded channels 5 may not only be multi-direction and intersecting, but also meandering in nature. Stated otherwise, in certain embodiments, the pathways defined by the channels 5 may appear, to some degree, randomized as to curvature and the like. In these and other embodiments, though, some degree of symmetry (i.e., as between the left and right sides of the helmet; see FIG. 1) may nevertheless be provided. In still other embodiments, the channels 5 may be wholly randomized; minimal or substantially no symmetry may exist.

Turning now to FIG. 6, exemplary structure of the embedded channels 5, in particular relative to the external surface 2 of the helmet 1 may be understood. In particular, in various embodiments, the embedded channels 5 may be inset relative to the exterior surface 2, such that even when the EL wire 20 is inserted therein, no portion of the channel or the wire protrudes above the exterior surface. In certain embodiments, as illustrated, the embedded channels 5 may be at least partly semi-circular in shape, substantially mirroring the shape of the EL wire 20 inserted therein. In other embodiments, not illustrated, the embedded channels 5 may be otherwise shaped, whether rectangular, triangular, or the like. The channels need only be sufficient in size and depth to receive therein the EL wire 20, such that the wire does not protrude above or beyond the external surface 2 and thus impede any aerodynamic characteristics of the helmet 1 itself As understood from FIG. 1 (by way of non-limiting example) and FIG. 6 in combination, portions of the embedded channels 5 may have associated therewith one or more retaining elements 6. These retaining elements 6 may be located periodically (i.e., at regular and/or irregular intervals) along a length of the passages defined by the embedded channels 5. In at least one embodiment the retaining elements 6 may be protruding clips, which collectively in pairs define an opening of the channels 5 smaller than a diameter of the EL wire 20. In this manner, once the EL wire 20 is placed into the channels 5, the wire pops through the retaining elements 6 and is thereafter prevented from escape from the channel 5 on its own. Stated otherwise, once within the channel 5 and secured beneath the retaining elements 6, some degree of wearer-imposed force will be required to thereafter remove the EL wire 20 from the channels 5.

Remaining with FIG. 6, it should also be understood that in certain embodiments the diameter of the at least semi-circular channels 5 is substantially larger than that of the EL wire 20. In stark contrast, the diameter of the opening defined by the retaining elements 6 at periodic intervals along the channels 5 is—as mentioned previously herein—smaller than that of the EL wire 20. In at least one embodiment, the relative diameters of the EL wire and the channels may be substantially equal, such that the EL wire is retained securely within the channels and axial slippage is minimal to none. In other embodiments, the EL wire may lay loosely within the channels, with the only means of securing the same within the channels being the retaining elements 6.

From FIG. 6 it may also be understood that the retaining elements 6 may be any combination of clips, magnetic strips, Velcro® or the like. In certain embodiments, the retaining elements 6 may also be pliable in nature, so as to permit—upon application of a certain degree of pressure—a wearer to remove or otherwise disengage the EL wire 20 therefrom, whether for re-routing of the EL wire through an alternative channel 5 or for wholesale removal of the EL wire from the helmet 1.

With reference momentarily to FIG. 2, according to various embodiments, the one or more embedded channels 5 may further include at least one end cap 7. The end cap 7 may provide a closed end or termination of the channel(s), as may be desirable for certain applications. In other embodiments, the channels 5 may have no end cap(s) 7, thereby providing a potentially greater degree of wearer customization, as may be desirable.

With reference momentarily to FIG. 2, one or more securing mechanisms 10 may be provided on or integral with the external surface 2 of the helmet 1. The securing mechanism(s) 10 are configured to substantially receive and retain an integrated controller 30, as described elsewhere herein. In at least the illustrated embodiment, the securing mechanisms 10 comprise at least two straps, integrally formed and extending from the external surface. In another embodiment, the securing mechanism 10 may be an integrated pouch (or an attachable pouch) that is sized and configured to receive therein the integrated controller 30 and also to retain the same during use of the helmet by the wearer.

In certain embodiments, the securing mechanism(s) 10 may be made of the same material as the external surface 2 of the helmet; in other embodiments, the securing mechanism(s) 10 may be made of a different material, including the non-limiting example of cloth or the like. In the illustrated embodiment of FIG. 2, the securing mechanism(s) 10 are provided on the rear or back surface of the helmet and also on an external surface; it should be understood that in other embodiments the securing mechanism may be otherwise provided (i.e., on a side surface of the helmet or the like, as a non-limiting example).

According to various embodiments, although illustrated in the drawings attached hereto as being external, the integrated controller may be fastened or otherwise retained (i.e., in a selectively removable fashion) within a pocket or recess integrally formed in the blow-molded structure of the bicycle helmet. For example, an enlarged recess may be provided in the rear of the helmet for receipt of the controller or other components, as necessary. Alternative placement may also be provided, whether for aesthetic or safety reasons.

Figure 7:
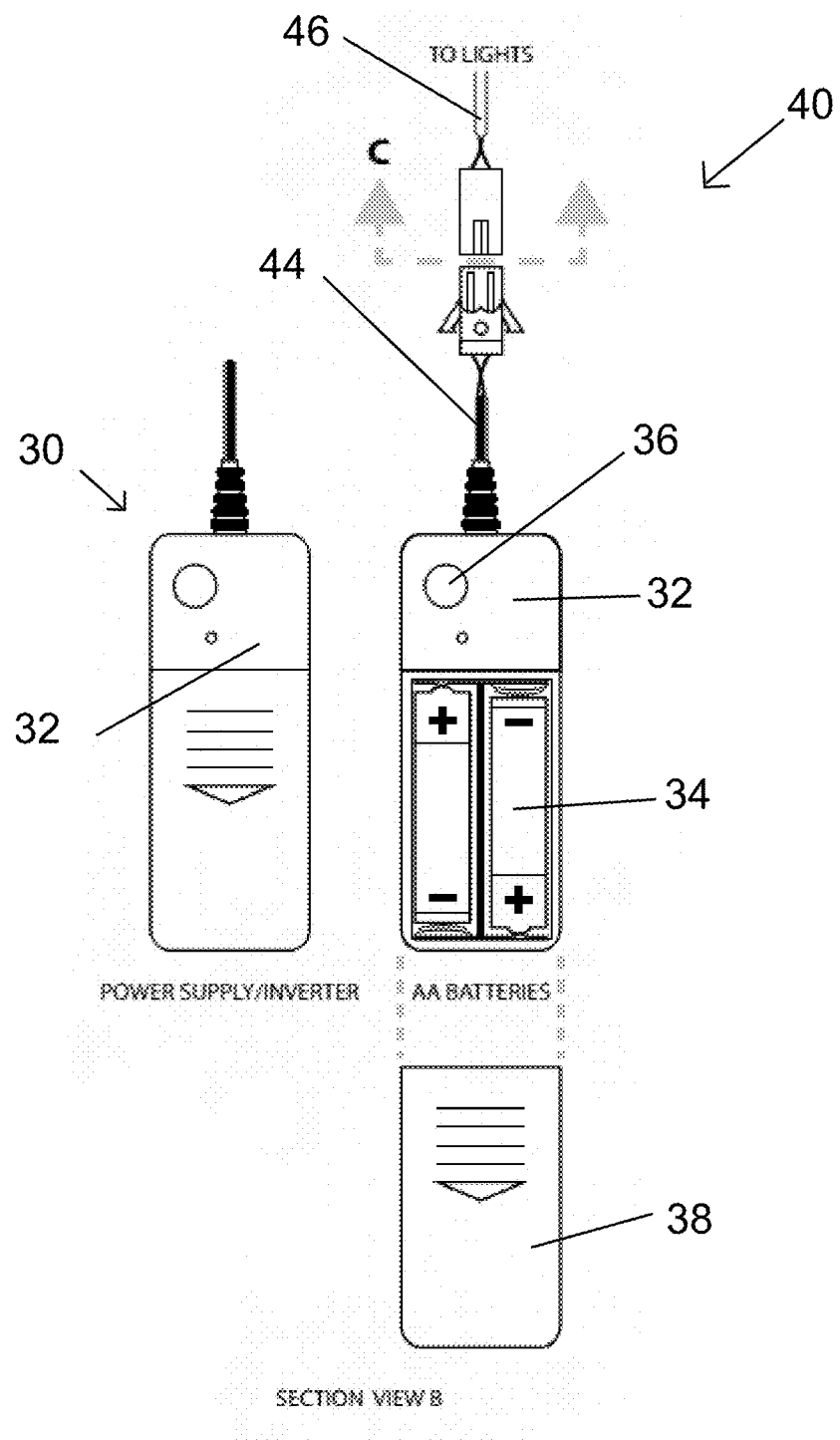
FIG. 7 depicts cross-section view B of FIG. 1, illustrating detail of assembled and unassembled views of an exemplary integrated controller that may be provided with the helmet of FIG. 1.

According to various embodiments and as discussed previously herein, the helmet 1 may also have an integrated controller 30 and associated circuitry, so as to provide power to the EL wire 20, upon placement thereof within the channels 5 formed on the external surface 2. Reference is made in particular to FIG. 2, which shows the controller 30 mounted within the securing mechanisms 10 of the helmet. Reference is also made to FIG. 7, which illustrates the integrated controller 30 and the various components thereof, both in an assembled orientation (left) and an unassembled or exploded orientation (right). As may be understood from FIG. 7, the integrated controller 30 according to various embodiments may include a housing 32, a power supply chamber 34, a user interface 36, a removable lid 38, and integrated circuitry (see by analogy circuitry 139 associated with alternative integrated controller 130 of FIG. 9).

According to various embodiments, the housing may substantially encase the associated circuitry and/or electronics of the controller 30. In at least the illustrated embodiment, a power supply chamber 34 may be selectively accessible via the lid 38. In other embodiments (see also FIG. 9), the power supply chamber may provide access to the associated circuitry or the like. Any type of power source may be utilized, whether conventional AA-type batteries, watch-type batteries, solar-powered batteries, rechargeable batteries, and/or the like.

In certain embodiments, an accelerometer may be further incorporated into the helmet 1 and/or with the integrated controller 30, such that a blinking pattern (or the like) of the EL wire 20 may be configured to adjust dependent upon a detected speed of the wearer/user of the bicycle helmet (i.e., when riding a bike, walking, or the like). This is particularly advantageous, as the blinking pattern may accelerate (or switch from solid to a blinking pattern) when a wearer is decelerating, so as to alert other travelers (in motorized vehicles or the like) nearby of the occurring deceleration.

According to various embodiments, one or more solar cells and/or a USB port may also be integrated within the helmet 1 (i.e., within the external surface 2) and/or the integrated controller 30, so as to permit control of the EL wire 20 (e.g., blinking pattern, solid, or the like). Control may be via a user interface 36 on the controller (i.e., an input button or the like) or remotely, for example, via a mobile phone application or the like, as may be initiated and controlled by the wearer of the helmet via wireless communication with the controller and/or the EL wire. A wireless transmitter may also be provided, to permit transmission of signals regarding a blinking pattern or the like (or other data) over a network (wireless or otherwise), as will be described in further detail below. This capability may also permit synchronization of multiple helmets 1 having EL wires 20 located in embedded channels 5 relative to one another when the helmets are in proximity with one another, for the non-limiting example of ensuring all riders in a parade have helmets displaying the same pattern. Additional applications are, of course, readily envisioned.

Figure 8:
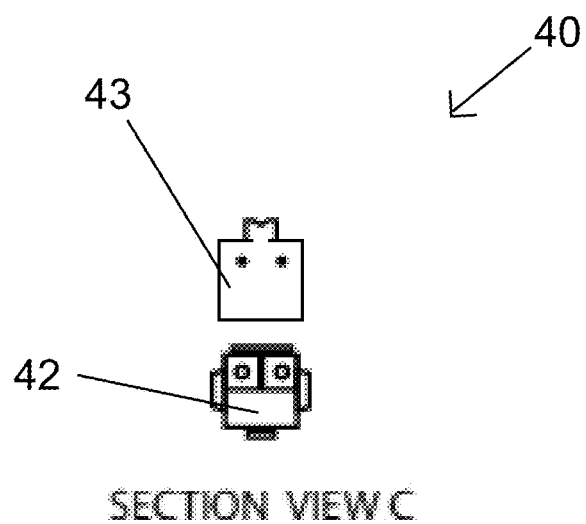
FIG. 8 depicts cross-section view C of FIG. 7, illustrating detail of the connector(s) provided with the integrated controller of FIG. 7 and/or the helmet of FIG. 1.

Turning now to FIG. 8, there is illustrated therein a connector 40 that provides an interface between the controller 30 and the EL wire 20 (see also FIGS. 1 and 7). In at least the illustrated embodiment, the connector 40 includes a first clip 42 and a second clip 43, which are configured to selectively mate and engage one another. In certain embodiments a male/female type connection may be provided; of course, in other embodiments, any kind of electrical connection (see e.g., first and second electrical connections 44, 46, in FIG. 7), as commonly known and understood in the industry may be employed, provided selective attachment/removal of the connection by a wearer is readily obtainable.

As mentioned, various embodiments of the integrated controllers 30, 130 (see FIGS. 7 and 9) may be implemented in various ways, including incorporating, in part, computer program products and/or circuitry-implemented components. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

Figure 9:
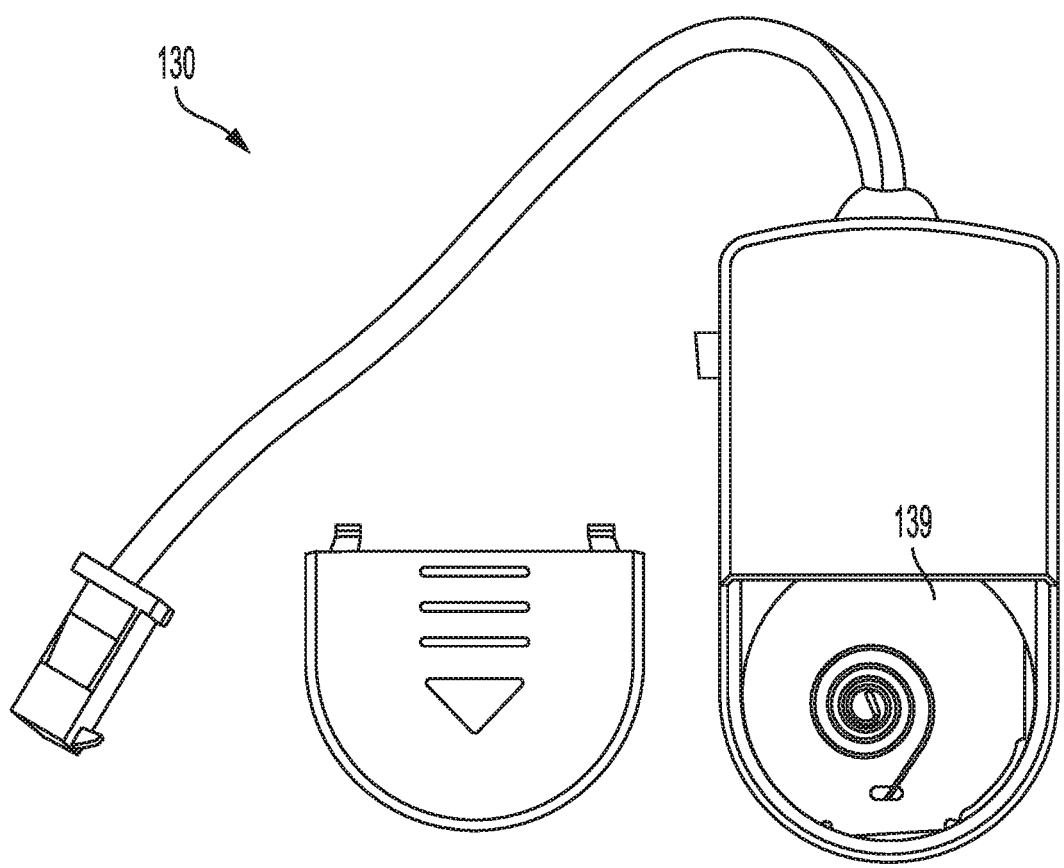
FIG. 9 depicts another exemplary integrated controller that may be provided with the helmet of FIG. 1.

As also mentioned, the integrated controller 30, 130 and/or additional components associated with the helmet 1 may communicate with one or more remotely located devices (e.g., a user's mobile device that may or may not have one or more mobile applications installed thereon, and/or other helmets within proximity of the helmet 1 for purposes of synchronization). In these and other embodiments, one or more networks may be utilized for enabling the communication between the helmet (via the controller 30, 130) and any remotely located devices (not illustrated). These networks may be capable of supporting communication in accordance with any one or more of a number of second-generation (2G), 2.5G, third-generation (3G), and/or fourth-generation (4G) mobile communication protocols, or the like. More particularly, the one or more networks may be capable of supporting communication in accordance with 2G wireless communication protocols IS-136 (TDMA), GSM, and IS-95 (CDMA). Also, for example, the one or more networks may be capable of supporting communication in accordance with 2.5G wireless communication protocols GPRS, Enhanced Data GSM Environment (EDGE), or the like. In addition, for example, the one or more networks may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, one or more of the components of the helmet (e.g., the integrated controller 30, 130) may be configured to communicate with other components of the helmet (e.g., the wires 6) in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Where wireless communication may be utilized according to various embodiments, antenna, transmitter, and receiver components (not illustrated) may also be incorporated within the integrated controller 30, 130, for example as part of the integrated circuitry 139 thereof (see FIG. 9). In these and other embodiments, the signals provided to and received from the transmitter and the receiver, respectively, may include signaling data in accordance with an air interface standard of applicable wireless systems to communicate with various entities, such as remotely located mobile devices, or the like. In this regard, the controller 30, 130 may be capable of operating with one or more air interface standards, communication protocols, modulation types, and access types. More particularly, the controller 30, 130 may operate in accordance with any of a number of wireless communication standards and protocols. In a particular embodiment, the mobile device 1300 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the controller 30, 130 may according to various embodiments communicate with various other entities using concepts such as Unstructured Supplementary Service data (US SD), Short Message Service (SMS), Multimedia Messaging Service (MMS), Dual-Tone Multi-Frequency Signaling (DTMF), and/or Subscriber Identity Module Dialer (SIM dialer). The controller 30, 130 can also download changes, add-ons, and updates, for instance, to its firmware, software (e.g., including executable instructions, applications, program modules), and operating system.

According to one embodiment, the controller 30, 130 may include a location determining device and/or functionality. For example, the controller 30, 130 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The controller 30, 130 may also comprise a user interface 36 (that can include a display or the like, not illustrated)

and/or a user input interface (also not illustrated). The user input interface can comprise any of a number of devices allowing the controller 30, 130 to receive data from a wearer of the helmet 1, such as a keypad (hard or soft), a touch display, voice or motion interfaces, or other input device. In embodiments including a keypad, the keypad can include (or cause display of) the conventional numeric (0-9) and related keys (#, *), and other keys used for operating the controller 30, 130 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

CONCLUSION

It will be appreciated that many variations of the above systems and methods are possible, and that deviation from the above embodiments are possible, but yet within the scope of the claims. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Such modifications may, for example, involve using a different source of energy beam than the exemplified electron beam such as laser beam. Other materials than metallic powder may be used such as powder of polymers or powder of ceramics. Still further, although specific terms are employed herein, they are used in a generic and descriptive sense only and not for purposes of limitation.

The invention claimed is:

1. A helmet comprising:
    a contoured external surface;
    a controller positioned on the contoured external surface;
    one or more non-linear channels embedded within the contoured external surface and defining two or more meandering and elongate pathways travelling over at least a portion of the contoured external surface;
    at least one electroluminescent (EL) wire located within and extending along at least a portion of the one or more channels, the EL wire being further selectively electrically connected to the controller; and
    a plurality of pairs of retaining elements periodically positioned adjacent an outer opening of the one or more channels,
    wherein:
        each retaining element within each pair being located on an opposing side of the one or more channels, and
        an opening defined between a portion of each of the plurality of pairs of retaining elements has a dimension less than a diameter of the EL wire.

2. The helmet of claim 1, wherein the two or more elongate pathways intersect with one another at least once.

3. The helmet of claim 1, wherein:
    a securing mechanism is integrally formed upon the contoured external surface; and
    the securing mechanism is sized to receive and retain the controller therein.

4. The helmet of claim 3, wherein the securing mechanism comprises at least two integrated straps formed in and extending from the contoured external surface.

5. The helmet of claim 3, wherein the securing mechanism comprises a pouch integrated in the contoured external surface.

6. The helmet of claim 1, wherein the controller is configured to selectively alter at least one characteristic of the EL wire.

7. The helmet of claim 6, wherein the at least one characteristic is a blinking pattern of the EL wire.

8. The helmet of claim 6, wherein the at least one characteristic is an on/off setting of the EL wire.

9. The helmet of claim 1, wherein the controller is configured to selectively determine at least one characteristic of a helmet in proximity with the helmet and to, based upon the determined at least one characteristic, alter a corresponding characteristic of the EL wire to match the determined at least one characteristic.

10. The helmet of claim 1, wherein the plurality of pairs of retaining elements comprise clips positioned at the outer opening of the channels such that the EL wire is secured beneath the clips and within the channels.

11. The helmet of claim 1, wherein the plurality of pairs of retaining elements comprise magnetic portions.

12. The helmet of claim 1, wherein the controller has a wireless transmitter and is configured to alter at least one characteristic of the EL wire based upon input received, via a remote application, from a wearer of the helmet.

13. The helmet of claim 12, wherein the remote application is installed on a mobile device utilized by the wearer of the helmet.

14. The helmet of claim 1, further comprising an accelerometer integral with the external surface.

15. The helmet of claim 14, wherein the controller is configured to alter at least one characteristic of the EL wire in response to readings obtained from the accelerometer.

16. A helmet comprising:
    a contoured external surface;
    a controller positioned on the contoured external surface;
    one or more channels embedded within the contoured external surface and defining two or more elongate pathways travelling over at least a portion of the contoured external surface;
    at least one electroluminescent (EL) wire located within and extending along at least a portion of the one or more channels, the EL wire being further selectively electrically connected to the controller; and
    a plurality of pairs of retaining elements periodically positioned adjacent the one or more channels,
    wherein:
        each retaining element within each pair being located on an opposing side of the one or more channels,
        an opening defined between a portion of each of the plurality of pairs of retaining elements has a dimension less than a diameter of the EL wire; and
        the two or more elongate pathways intersect with one another at least once.

17. The helmet of claim 16, wherein:
    a securing mechanism is integrally formed upon the contoured external surface; and
    the securing mechanism is sized to receive and retain the controller therein.

18. The helmet of claim 16, wherein the controller is configured to selectively alter at least one characteristic of the EL wire.

19. The helmet of claim 16, wherein the controller has a wireless transmitter and is configured to alter at least one characteristic of the EL wire based upon input received, via a remote application, from a wearer of the helmet.

20. The helmet of claim 16, further comprising an accelerometer integral with the external surface, wherein the controller is configured to alter at least one characteristic of the EL wire in response to readings obtained from the accelerometer.

* * * * *